Patented Oct. 30, 1945

2,388,158

UNITED STATES PATENT OFFICE 2,388,158

PRODUCTION OF UNSATURATED COMPOUNDS

Hans George Kirschenbauer, Allendale, N. J., assignor to Colgate-Palmolive-Peet Company, Jersey City, N. J., a corporation of Delaware No Drawing. Application July 22, 1942, Serial No. 451,977

12 Claims. (Cl. 260—405.5)

The present invention relates to a process for producing synthetic drying oils, and, more particularly, to a process of treating castor oil and derivatives thereof to produce an unsaturated fatty oil having conjugated double bonds.

Tung oil has been employed for some years in the paint, varnish, plastics and other industries as a fast-drying oil, and it has been recognized that its drying properties are associated with the presence of constituents having a conjugated double bond structure. Other natural oils, the polyunsaturated constituents of which have unconjugated double bonds, do not exhibit such fast-drying effect and in their natural state cannot be successfully substituted for tung oil.

Castor oil, the principal constituent of which is the glyceride of ricinoleic acid, a hydroxymonounsaturated fatty acid, is also unsuitable as a substitute for tung oil, but the hydroxyl group of ricinoleic acid is in such position with respect to the double bond that dehydration, if so directed as to remove the hydroxyl group with the hydrogen atom from the correct adjoining carbon atom, may provide a diunsaturated acid with the double bonds in conjugated position. This may be seen from the following structural formula for ricinoleic acid:

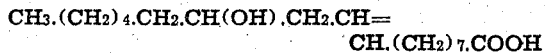

$$CH_3.(CH_2)_4.CH_2.CH(OH).CH_2.CH= CH.(CH_2)_7.COOH$$

However, if the dehydration results in removal of a hydrogen atom from the adjoining carbon atom remote from the olefinic linkage, an unconjugated acid of little value for the present purpose would result.

In recent years, there have been many methods described for converting castor oil into drying oils, as by heating the castor oil to body it, and some methods have been directed to formation from castor oil of polyunsaturated materials having conjugated double bonds. For example, Scheiber, in his U. S. Patent No. 1,942,778, discloses a process of heating ricinoleic acid with a catalyst and distilling in vacuo to obtain diunsaturated fatty acids. This process gives a mixture of constituents, as the dehydration occurs in both directions and both conjugated and unconjugated diunsaturated fatty acids are produced. U. S. Patent No. 2,140,271 to Schwarcman describes a complex, two-stage method of converting castor oil to a drying oil wherein the castor oil is heated with a catalyst until dehydration results, the catalyst is filtered off, and the intermediate oil thereby formed is further heated for several hours to body the oil, thereby developing drying properties. No attempt is made in this procedure to direct the dehydration, and a mixture of conjugated and unconjugated constituents is prepared. Thus, although earlier investigators and experimenters have suggested numerous methods for producing drying oils from castor oil, the art, so far as is known, has not been able to develop a method on a practical and industrial scale for successfully dehydrating castor oil and directing said dehydration to produce fatty materials substantially all of which have double bonds in conjugated position or for successfully dehydrating castor oil and substantially simultaneously causing the double bonds of fatty materials having an unconjugated structure to migrate into a conjugated position.

It is an object of the present invention to provide an improved process for treating castor oil and/or derivatives thereof to produce diunsaturated fatty materials having conjugated double bonds.

It is also an object of this invention to provide a new process for converting castor oil into a fast-drying oil in a relatively short time.

It is another object of the invention to provide a novel and improved process for dehydrating castor oil to produce diunsaturated fatty compounds, a major proportion of which have their double bonds in conjugated position.

Other objects and advantages of this invention will be apparent from the following description.

According to the present invention, castor oil and/or ricinoleic acid and/or derivatives thereof are treated, with or without additional fatty material, with suitable alkaline agents and subjected in an inert atmosphere to a temperature above the melting point of the resulting anhydrous soaps. The treatment takes place in a closed vessel in the absence of liquid water and of air or other oxidizing materials, while an inert gas, such as steam, hydrocarbon vapor or nitrogen, is preferably passed through the molten reaction mixture. The use of a non-acid dehydrating catalyst, such as bleaching clay, fuller's earth, silica gel, alumina, iron oxide, zinc oxide, metallic iron and the like, is of advantage in the process. The catalyst is sufficiently finely divided to be suspended in the reaction mixture and can be kept in suspension by the bubbling of the inert gas therethrough. Although the treatment may be carried out at superatmospheric pressure, at atmospheric pressure or under reduced pressure, it is preferred that a partial vacuum be applied. Glycerine, if any, and unsaponifiable material are vaporized by this treatment, and their removal from the reaction vessel is facilitated by the inert gas, where such gas is employed. The vaporized material may be recovered, if desired. The resulting anhydrous soap mixture comprises soaps of diunsaturated fatty acids, a major proportion of which have their double bonds in conjugated position.

Although the mechanism of the reaction is not thoroughly understood, it is believed that this treatment of the ricinoleic acid (12-hydroxy-9-octadecenoic acid) and/or derivatives thereof dehydrates this material to form a mixture containing diunsaturated acids comprising 9,11-octadecadienoic acid and 9,12-octadecadienoic acid. The treatment simultaneously causes the double bond of the latter acid to migrate from the 12-13 position to the 11-12 position, so that substantially all of the diunsatuated acid with unconjugated double bonds present in the mixture is converted to the diunsaturated acid with conjugated double bonds. It will be appreciated that this theory of reaction is not necessary to an understanding of the present invention, as disclosed herein, and that the same is advanced merely as an aid to the further development of the art.

The resulting mixture of anhydrous soap, as formed by the treatment discussed supra, is drawn off in the fluid state, while taking suitable precautions to exclude harmful contact of air with the hot soap. One way of accomplishing such withdrawal is to discharge the fluid soap into and beneath the surface of a body of water. The soap is dissolved in water to give an aqueous solution, and this solution is acidulated, preferably by the addition of dilute mineral acid. The fatty acid can then be separated out by decantation, withdrawal of the lower aqueous solution, centrifuging or the like, and may be subjected to fractional distillation, fractional crystallization and/or other separation and purification procedures, if desired. The fatty acid may then be esterified with glycerine to produce an oil with fast-drying properties, or other esters may be formed by esterification with the corresponding alcohols.

Esterification of the free fatty acids with glycerine may be accomplished by heating the mixture, preferably under vacuum, to about 200° C. or higher, with or without the presence of a suitable catalyst, such as beta-naphthalene sulphonic acid, beta-camphor sulphonic acid, or other acid, alkaline or neutral catalysts. Care should be exercised in this operation, as excessive temperatures or large amounts of catalysts may cause polymerization of the unsaturated acids. Glycerides may also be formed by first esterifying with a lower monobasic alcohol, such as methyl alcohol, and then distilling the resulting ester with glycerine, with or without a catalyst, continually adding fresh glycerine and removing the alcohol as liberated. Another procedure for producing glycerides is directly to react the anhydrous soap formed with 1,2,3-trichlor propane and to remove sodium chloride therefrom.

Saturated and monounsaturated constituents of the oils, where undesired in the product, may be separated out in the form of their free fatty acids or esters either before or after treatment in accordance with the present process by fractional distillation, fractional crystallization and/or solvent extraction, or other methods.

The temperature of the treatment has been described supra as above the melting point of the resulting anhydrous soaps. Normally, while this temperature is high enough to effect a desirable change in the properties of the soap, migration of the double bonds to conjugated positions occurs at a somewhat higher temperature. In the usual case, such temperature will generally be of the order of about 285° C. to about 310° C., and in most cases temperatures of about 290° C. to about 300° C. will be found suitable. The temperature limits are necessarily influenced by the presence in the reaction mixture of additional fatty materials and by the character of the resulting soap. With respect to the upper limit, the temperature above which substantial polymerization or decomposition of the soap occurs is not to be exceeded. It is advantageous at all times to prevent local overheating and decomposition at surfaces of contact between the reaction vessel and the product. During the treatment, the mass is thoroughly agitated, and the inert gas which is passed through the material may be employed as the sole or the supplementary means for such agitation. The inert gas is also used for facilitating the carrying off of volatilized material. Stirrers and/or other means for mechanically agitating the molten mass may also be used to advantage.

The treatment of this invention is also applicable to materials which are already in saponified form, and such saponified substance may be treated alone or with unsaponified fatty oils, esters and acids. Where part of the material subjected to the treatment is already saponified, it is advantageous during the initial stages of heating to prevent local overheating and decomposition at the surface of contact between the reaction vessel and the product by first heating the saponified material and maintaining it at a temperature of about 290° C. to about 300° C. where it is fluid, and then adding the unsaponified material at a rate not substantially greater than the rate at which it may be heated to the temperature necessary for fluidity. The process may be operated with continuous, intermittent, or batch additions of crude materials and withdrawals of treated products.

A slight excess of causttic alkali is preferably employed, and, although various alkaline materials may be used for the saponification, free alkali in excess of the amount of alkaline material required for saponification is added. Such excess of free alkali is preferably equivalent to up to about 15% (usually more than about 0.5%) of the alkaline agent needed for saponifying the fatty material, as it has been found that a large excess of alkali is detrimental and productive of by-products which decrease the yield of drying oil. The formation of these by-products, which include heptaldehyde, undecenoic acid soap, decanedioic acid soap and methyl hexyl carbinol, is particularly favored by the presence of large excesses of alkali above the amount of alkali or alkaline material required for saponification, and especially at the higher temperatures in the range.

The various alkaline materials which may be used for the saponification include caustic alkalies like sodium or potassium hydroxide, lime, carbonated alkalies like sodium or potassium carbonate, magnesium carbonate, etc., or mixtures thereof. If alkaline materials other than caustic soda and soda ash are employed, it may be necessary or desirable to change the temperature used, because of the differences in the melting points of soaps formed with materials other than sodium. In any event, the temperature should be sufficiently high to insure fluidity, being above the melting point of the resulting anhydrous soap and below the temperature of substantial decomposition or polymerization.

The following examples are merely illustrative of the present invention, and it will be understood that the invention is not limited thereto.

Example I

About 100 parts of ricinoleic acid are rapidly heated to about 260° C., while steam is continuously passed therethrough. About 18 parts of anhydrous sodium carbonate are added to saponify the acid, and about 1.3 parts of the anhydrous caustic soda are incorporated in the mixture. The temperature is rapidly raised to about 300° C. and maintained at such temperature for about one hour. During this time, the mass is vigorously agitated with steam, which forms an inert atmosphere above the reaction mass. The molten reaction mass is then pumped from the vessel into about 200 parts of water, the reaction mass being admitted under the surface of the water to avoid oxidation. A sufficient amount of dilute sulphuric acid for completely liberating the fatty acid is added, and the aqueous mass is vigorously agitated. Upon settling, two layers are formed and the lower aqueous layer is withdrawn. The residue is washed with water to remove any retained sulphuric acid from the fatty acid. The acid produced gives evidence of containing a large proportion of constituents having conjugated double bonds, and glycerides formed therefrom exhiibt fast-drying effects.

Example II

About 100 parts of castor oil, about 14 parts of pulverized caustic soda and about 2 parts of silica gel are intermittently fed into a reaction vessel provided with mechanical stirrers, and the mixture is heated to about 275° C. A stream of nitrogen is passed through the mass, and the temperature of the reaction mass is rapidly raised to about 300° C. and held at this temperature for about forty-five minutes. During this time, the reaction mass is vigorously agitated with the aid of the nitrogen stream, and glycerine and unsaponifiable and odoriferous matter are removed as vapors from the reaction chamber. The molten reaction mass is then pumped into a pressure mixing vessel, where it is dissolved in water. The soap formed is acidulated, using diute sulphuric acid therefor, and, after settling, the lower aqueous layer is withdrawn and the free fatty acids are recovered. The fatty acids are washed with water and dried.

Example III

Castor oil is alcoholized with methyl alcohol, and about 200 parts of the resulting methyl esters are mixed with about 28 parts of ground caustic soda and about 5 parts of alumina and fed into a heated reaction vessel equipped with a mechanical agitator. The vessel is evacuated to a pressure of about 10 mm. of mercury, and steam is passed through the reaction mass continuously, the temperature of the mixture being maintained at about 260° C. throughout the feeding. The temperature is then rapidly raised to about 290° C. and kept at this temperature for about seventy minutes, during which time the steam is continuously bubbled therethrough to aid in the agitation of the reaction mixture and to provide an inert atmosphere thereover. The reaction mass is thereafter run into water, and dilute sulphuric acid is added to the aqueous mass to acidulate the soap. The material settles into two layers, and the upper layer is siphoned off, washed and dried and is then treated with about three to four times its volume of methyl alcohol. A small amount of concentrated sulphuric acid is added as an esterifying agent, and the mass is refluxed for about an hour. It is then permitted to stand in a warm place for about twenty-four hours, whereafter it is cooled, diluted with water and extracted with ether. The ether extract is subjected to evaporation to remove the ether and to recover the methyl esters.

Example IV

About 250 parts of castor oil are heated to about 265° C., while a stream of steam is passed therethrough. About 50 parts of caustic potash are then added to the oil, the reaction vessel is evacuated to a pressure of about 4 inches of mercury, and the temperature is rapidly raised to about 290° C. and there maintained for about forty minutes. Steam is bubbled through the molten mass throughout this period, serving to agitate the mixture, to provide an inert atmosphere and to facilitate removal of glycerine and unsaponifiable matter. The soap formed is pumped into water containing sufficient hydrochloric acid to acidulate the soap, and it is there vigorously agitated. The liquid mass settles into two layers, and the upper layer is decanted, washed and dried. The free fatty acids thus recovered are mixed with glycerine and a small amount of beta-naphthalene sulphonic acid as an esterification catalyst, and the mixture is heated under partial vacuum at about 200° C. for about two hours to esterify. The oil formed is found to exhibit the properties of materials having conjugated double bonds, including fast-drying effects.

Various fatty materials and fatty acids may be employed in admixture with the castor oil and/or ricinoleic acid and/or derivatives thereof, and it is also possible to add other organic materials at any point during the process. Where the materials added contain polyunsaturated constituents having unconjugated double bonds, such as linseed oil, cottonseed oil or foots, corn oil, soya bean oil, whale oil, fish oils, sesame seed oil, safflower seed oil, perilla oil, sunflower oil and the like, or the fatty acids, esters and salts thereof, the process of the present invention operates to cause their double bonds to migrate into conjugated position. Other fatty materials containing only small amounts of polyunsaturated constituents (i. e., those with two or more double bonds) or containing only saturated or monounsaturated constituents may also be admixed with the castor oil and/or ricinoleic acid and/or derivatives thereof, although the presence of the products of such materials will not generally enhance the fast-drying effect of the castor oil product. However, the occurrence of some of these materials may have a desirable modifying effect which is sometimes of value in the product. Thus, the addition of such materials as tallow, garbage grease, wool fat, spermaceti, various grades of wood and gum rosin, coconut oil, olive oil, palm oil, montan wax, carnauba wax, Japanese wax and Chinese wax, as well as the various individual fatty or resin acids or derivatives thereof or admixtures of any of these fats, oils, waxes, resins and acids is also contemplated. Materials having conjugated double bonds, including tung oil, oiticica oil and derivatives of these oils, may likewise be added.

Besides their availability as a source of fast-drying oils, the products of the process of the present invention containing constituents having conjugated double bonds, and particularly 9,11-octadecadienoic acid and derivatives thereof, with or without the addition of other fatty materials, can be used for many other purposes. As will be apparent from the foregoing, these materials are generally more reactive in the conjugated form and may be used in the synthesis of various organic compounds, such as tricarboxylic acids. The free fatty acid may also be mixed with other acids, such as phthalic acid, maleic acid, succinic acid, abietic acid, etc., and the mixture esterified with glycerine or other polyhydric alcohols to form alkyd resins for use in plastic and coating compositions and as bonding materials.

Although the present invention has been described with respect to particular embodiments and examples thereof, it will be understood by those skilled in the art that other variations and modifications of the invention can be made and various equivalents can be substituted therefor without departing from the principles disclosed herein. Thus, various synthetic hydroxy-monounsaturated fatty materials and/or polyhydroxy fatty materials may be treated along with or instead of castor oil and derivatives thereof to produce polyunsaturated compounds having conjugated double bonds. These and other variations and modifications are believed to be within the scope of the present specification and within the purview of the appended claims.

I claim:

1. A process which comprises heating a fatty material selected from the group consisting of ricinoleic acid, soaps of ricinoleic acid and esters involving the carboxyl group of ricinoleic acid, with an alkaline agent in an inert atmosphere at a temperature of about 285° C. to about 310° C. but below the temperature of substantial polymerization of the resulting anhydrous product, whereby a product containing polyunsaturated compounds having conjugated double bonds is formed, and recovering polyunsaturated compounds having conjugated double bonds from said product.

2. A process which comprises heating a fatty material selected from the group consisting of ricinoleic acid, soaps of ricinoleic acid and esters involving the carboxyl group of ricinoleic acid, with an alkaline agent in the absence of air and liquid water at a temperature of about 285° C. to about 310° C. but below the temperature of substantial polymerization of the resulting anhydrous product while thoroughly agitating and intimately contacting the material with a stream of an inert gas, whereby a product containing polyunsaturated compounds having conjugated double bonds is formed, and recovering polyunsaturated compounds having conjugated double bonds from said product.

3. A process which comprises heating a fatty material selected from the group consisting of ricinoleic acid, soaps of ricinoleic acid and esters involving the carboxyl group of ricinoleic acid, with an alkaline agent in the presence of a dehydrating catalyst and in the absence of air and liquid water at a temperature of about 285° C. to about 310° C. but below the temperature of substantial polymerization of the resulting anhydrous product while thoroughly agitating and intimately contacting the material with a current of steam.

4. A process which comprises heating a fatty material selected from the group consisting of ricinoleic acid, soaps of ricinoleic acid and esters involving the carboxyl group of ricinoleic acid, with an alkaline agent in the absence of air and liquid water at a temperature of about 285° C. to about 310° C. but below the temperature of substantial polymerization of the resulting anhydrous product while passing a current of steam through said material, said alkaline agent comprising free alkali in excess of the amount of alkaline agent sufficient to saponify said fatty material.

5. A process which comprises heating a fatty material selected from the group consisting of ricinoleic acid, soaps of ricinoleic acid and esters involving the carboxyl group of ricinoleic acid, with an alkaline agent in the presence of a dehydrating catalyst and in the absence of air and liquid water at a temperature of about 285° C. to about 310° C. but below the temperature of substantial polymerization of the resulting anhydrous product while passing a stream of an inert gas through said material, said alkaline agent comprising free alkali in excess of the amount of alkaline agent sufficient to saponify said fatty material, whereby a product containing polyunsaturated compounds having conjugated double bonds is formed, and recovering polyunsaturated compounds having conjugated double bonds from said product.

6. A process which comprises heating a fatty material selected from the group consisting of ricinoleic acid, soaps of ricinoleic acid and esters involving the carboxyl group of ricinoleic acid, with an alkaline agent in the absence of air and liquid water at a temperature of about 290° C. to about 300° C. while passing a stream of an inert gas through said material.

7. A process which comprises heating a fatty material selected from the group consisting of ricinoleic acid, soaps of ricinoleic acid and esters involving the carboxyl group of ricinoleic acid, with an alkaline agent in the presence of a dehydrating catalyst and in the absence of air and liquid water at a temperature of about 290° C. to about 300° C. while passing a stream of an inert gas through said material, whereby a product containing polyunsaturated compounds having conjugated double bonds is formed, and recovering polyunsaturated compounds having conjugated double bonds from said product.

8. A process which comprises heating a fatty material selected from the group consisting of ricinoleic acid, soaps of ricinoleic acid and esters involving the carboxyl group of ricinoleic acid, with an alkaline agent in the presence of silica gel and in the absence of air and liquid water at a temperature of about 290° C. to about 300° C. while passing a stream of nitrogen through said material.

9. A process which comprises heating a fatty material selected from the group consisting of ricinoleic acid, soaps of ricinoleic acid and esters involving the carboxyl group of ricinoleic acid, with an alkaline agent comprising excess free alkali under reduced pressure and in the absence of air and liquid water at a temperature of about 290° C. to about 300° C. while thoroughly agitating and intimately contacting the material with a stream of an inert gas.

10. A process which comprises heating a fatty material selected from the group consisting of ricinoleic acid, soaps of ricinoleic acid and esters involving the carboxyl group of ricinoleic acid, with an alkaline agent comprising excess free alkali under reduced pressure in the presence of a dehydrating catalyst and in the absence of air and liquid water at a temperature of about 290° C. to about 300° C. while thoroughly agitating and intimately contacting the material with a stream of an inert gas, whereby a product containing polyunsaturated compounds having conjugated double bonds is formed, and recovering polyunsaturated compounds having conjugated double bonds from said product.

11. A process which comprises heating a fatty material selected from the group consisting of ricinoleic acid, soaps of ricinoleic acid and esters involving the carboxyl group of ricinoleic acid, with an alkaline agent in the absence of air and liquid water at a temperature of about 290° C. to about 300° C. while passing a current of steam through said material, said alkaline agent comprising an excess of free alkali equivalent to up to about 15% of the amount of alkaline agent necessary to saponify said fatty material, whereby a product containing polyunsaturated compounds having conjugated double bonds is formed, and recovering polyunsaturated compounds having conjugated double bonds from said product.

12. A process which comprises heating a fatty material selected from the group consisting of ricinoleic acid, soaps of ricinoleic acid and esters involving the carboxyl group of ricinoleic acid, with an alkaline agent in the presence of a dehydrating catalyst and in the absence of air and liquid water at a temperature of about 290° C. to about 300° C. while passing a current of steam through said material, said alkaline agent comprising free alkali in excess of the amount of alkaline agent sufficient to saponify said fatty material, whereby a product containing polyunsaturated compounds having conjugated double bonds is formed, and recovering polyunsaturated compounds having conjugated double bonds from more saturated compounds in said product.

HANS GEORGE KIRSCHENBAUER.